(12) United States Patent
Su (10) Patent No.: US 6,787,070 B2
(45) Date of Patent: Sep. 7, 2004

(54) APPARATUS AND METHOD OF FILLING A MOLD FOR MANUFACTURING AN OPHTHALMIC LENS

(75) Inventor: Kai C. Su, Alpharetta, GA (US)

(73) Assignee: Technology Resource International Corp., Alpharetta, GA (US)

( * ) Notice: Subject to any disclaimer, the term of this patent is extended or adjusted under 35 U.S.C. 154(b) by 25 days.

(21) Appl. No.: 09/938,279

(22) Filed: Aug. 23, 2001

(65) Prior Publication Data

US 2002/0047220 A1 Apr. 25, 2002

Related U.S. Application Data

(63) Continuation-in-part of application No. 09/343,802, filed on Jun. 30, 1999, now abandoned, which is a continuation-in-part of application No. 09/026,222, filed on Feb. 19, 1998, now Pat. No. 6,103,148.

(51) Int. Cl.[7] .............................................. B29D 11/00
(52) U.S. Cl. ........................ 264/1.1; 264/2.5; 249/105; 425/808; 425/812
(58) Field of Search ........................... 264/1.1, 2.2, 2.5; 249/82, 105, 117; 425/808, 812

(56) References Cited

U.S. PATENT DOCUMENTS

| | | | |
|---|---|---|---|
| 2,406,361 A | 8/1946 | Fairbank et al. | 18/34 |
| 2,443,826 A | 6/1948 | Johnson | 18/42 |
| 3,211,811 A | 10/1965 | Lanman | 264/1 |
| 4,166,088 A | 8/1979 | Neefe | 264/1 |
| 4,497,754 A | 2/1985 | Padoan | 264/1.4 |
| 4,693,446 A * | 9/1987 | Orlosky | 249/82 |
| 5,110,514 A | 5/1992 | Soane et al. | 264/496 |
| 5,213,825 A | 5/1993 | Shimizu et al. | 425/595 |
| 5,372,755 A | 12/1994 | Stoerr et al. | 264/1.27 |
| 5,415,817 A | 5/1995 | Shiao et al. | 264/2.2 |
| 5,512,221 A | 4/1996 | Maus et al. | 264/2.5 |
| 5,547,618 A | 8/1996 | Magne | 264/1.36 |
| 5,605,656 A | 2/1997 | Sasano | |
| 5,611,969 A | 3/1997 | Cano et al. | 264/2.5 |
| 5,662,839 A | 9/1997 | Magne | 264/1.38 |
| 6,068,464 A * | 5/2000 | Su et al. | 425/808 |
| 6,099,764 A * | 8/2000 | Su et al. | 425/808 |

\* cited by examiner

*Primary Examiner*—Mathieu D. Vargot
(74) *Attorney, Agent, or Firm*—Merchant & Gould, LLC (57) ABSTRACT

An apparatus and method for filling a mold for casting optical lens. Two molding shells and a closure member form a mold with a molding cavity. To fill the mold a fluid lens-forming material is introduced into the molding cavity through a casting opening formed in the closure member. Air is venting out during the filling process through a venting opening also formed in the closure member. Both the casting opening and the venting opening are located in the upper portion of the molding cavity but spaced apart from each other at an acute angle.

35 Claims, 3 Drawing Sheets

APPARATUS AND METHOD OF FILLING A MOLD FOR MANUFACTURING AN OPHTHALMIC LENS

This application is a continuation-in-part of U.S. application Ser. No. 09/343,802 filed on Jun. 30, 1999, which status now was abandoned and itself was a continuation-in-part of U.S. application Ser. No. 09/026,222 filed on Feb. 19, 1998, entitled "Method for Curing a Lens-Forming Liquid," which was issued on Aug. 15, 2000 as U.S. Pat. No. 6,103,148. Both U.S. application Ser. No. 09/343,802 and U.S. application Ser. No. 09/026,222 are hereby incorporated herein in their entireties by reference.

BACKGROUND OF THE INVENTION

1. Field of the Invention

The present invention relates to an apparatus and method of filling a mold for manufacturing an ophthalmic lens.

2. Background Art

Most lenses today are made by molding plastic because of its light weight, density, refractive index, and impact resistance. To form a lens, two molding shells, often referred as a front mold and a back mold in the art of lens making, are used. Each molding shell has a facing inside surface. When these two molding shells are properly positioned at a desired distance and rotational orientation to each other, their facing inside surfaces are a negative image of the surfaces of the lens to be formed. A closure member is used to cooperate with the molding shells to form a mold with a molding cavity. Then a fluid lens-forming material, normally a liquid monomer, is inserted into and contained in the molding cavity defined by the two molding shells and the closure member. The closure member normally has a casting opening through which the fluid lens-forming material is introduced into the cavity. Once the fluid lens-forming material is in the cavity, it is cured to form a hardened polymeric lens taking the shape of the molds.

Figure 1:
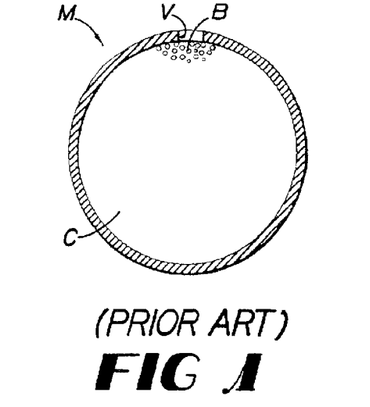
FIG. 1 is a vertical cross-sectional view of a prior art filling a mold from the top of the mold.

Currently, there are two ways to fill a mold in molding the lenses in the art. The first, conventional way is a "top" filling method as shown in FIG. 1 of this specification. In FIG. 1, a mold M with a molding cavity C is vertically positioned so that an opening V is at the top of the mold M. A filling device (not shown) in connection with a reservoir of a fluid lens-forming material delivers the fluid lens-forming material into the molding cavity C through a filling needle via the opening V. The opening V also functions as an air venting channel during the process. Inevitably, some air bubbles B generated during the filling process may be easily trapped at the opening V and may form an air block that slows down the filling process. Moreover, the "syrup" effect well known to glass makers is also evident with this "top" filling method. That is, given the viscosity of the lens-forming material, the fluid flows slowly, in "runs," into the molding cavity C and the air block formed at the opening V further frustrates the filling process. Because of the uneven, slow flow of the fluid lens-forming material into the molding cavity C, the likelihood of optical defects in the resulting lens is increased.

Figure 2:
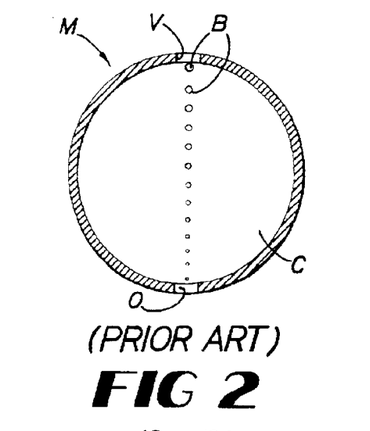
FIG. 2 is a vertical cross-sectional view of a prior art filling a mold from the bottom of the mold.

The second filling method is a "bottom" filling method as shown in FIG. 2 of this specification. In FIG. 2, a casting opening O is separated from the venting opening V in about 180°. The mold M is positioned so that the casting opening O is located at the bottom of the mold M. The lens-forming material is introduced into the molding cavity C from the bottom through the casting opening O. To overcome gravity, pumping means (not shown) may be used to cause the lens-forming material to flow into the cavity C without significantly pressurizing it. Air venting is provided through the venting opening V located at the top of the molding cavity C. Because this filling method separates the venting opening from the casting opening, the interference of air bubbles with the flow of the fluid lens-forming material is eliminated and the "syrup" effect is reduced greatly. Thus, it is able to shorten the filling process significantly.

However, the bottom filling method introduces a potential new quality problem. As known to the people skilled in the art, the center region of a formed optical lens is the most optically active area. Therefore, any defect in this region will compromise the quality of the formed lens. Because air bubbles inevitably produce optical defects, it is preferred not to allow the air bubbles to pass through this optically active region. However, as shown in FIG. 2, the air bubbles B have to travel through the most optically active region to reach the venting opening V. In fact, the air bubbles B cross the entire molding cavity C, which significantly increases the likelihood of optical defects in the finished lens. Thus, the bottom filling method may seriously compromise the optical quality of the formed optical lens.

Accordingly, there exists a need for an improved apparatus and method for filling a mold for molding optical lenses.

SUMMARY OF THE INVENTION

The present invention overcomes the disadvantages of the prior art and discloses an entirely new method of filling a mold for molding lens and related apparatus. In one aspect, the present invention relates to a method for molding an optical lens. In one embodiment, the method includes the steps of providing a mold having two molding shells disposed on edge and substantially vertically oriented, and an annular closure member having an outer surface disposed at the periphery of the molding shells cooperating with the two molding shells to define a molding cavity having a center, a vertical axis and a horizontal axis perpendicular thereto, both axes passing through the center to thereby divide the mold into an upper portion and a lower portion, a venting opening and a casting port disposed at the upper portion of the mold and spaced apart from each other at an acute angle, wherein the venting opening is in fluid communication with the ambient air and the molding cavity, and the casting port is separated from the ambient air by the outer surface of the closure member and in fluid communication with the molding cavity, introducing a fluid lens-forming material into the molding cavity through the casting port, curing the fluid lens-forming material so that the fluid lens-forming material is hardened to form the optical lens, and removing the optical lens from the molding cavity.

Because of the separation and the special geometric arrangement of the venting opening and the casting port, the fluid lens-forming material is filled into the molding cavity without interference from the air venting process. Any trapped air bubbles travel to the venting opening and out of the mold from there due to gravity without passing through the optically active area of the optical lens formed. Moreover, the filling of the fluid lens-forming material is further facilitated by gravity and a pumping device is no longer necessary. Thus, the present invention avoids the "syrup" effect, improves the quality of the lens formed and further facilitates the filling process.

In another aspect, the present invention relates to a method for molding an optical lens. In one embodiment, the method includes the steps of providing a mold having two molding shells disposed on edge and substantially vertically oriented, and an annular closure member disposed at the periphery cooperating with the two molding shells to define a molding cavity which has a center, a vertical axis and a horizontal axis perpendicular to each other, both axes passing through the center to thereby divide the mold into an upper portion and a lower portion, a venting opening disposed at the upper portion of the mold and communicating with the molding cavity, injecting a fluid lens-forming material into the molding cavity through a port at a position at the upper portion of the mold but apart from the location of the venting opening at acute angle, wherein the port is separated from the ambient air by the outer surface of the closure member, curing the fluid lens-forming material so that the fluid lens-forming material is hardened to form the optical lens, and removing the optical lens from the molding cavity.

In a further aspect, the present invention relates to a method for molding an optical lens. In one embodiment, the method includes the steps of providing a mold having two molding shells disposed on edge and substantially vertically oriented, and an annular closure member having an outer surface disposed at the periphery cooperating with the two molding shells defining a molding cavity with a center and having a vertical axis and a horizontal axis perpendicular to each other, both axes passing through the center thereby dividing the mold into an upper portion and a lower portion, a venting opening and a plurality of casting openings disposed at the upper portion of the mold and spaced apart from each other, the venting opening and each of the casting openings forming an acute angle between them, the venting opening and the plurality of casting openings communicating with the molding cavity, wherein at least one of the plurality of casting openings is a port being separated from the ambient air by the outer surface of the closure member, introducing a fluid lens-forming material into the molding cavity through a casting opening, curing the fluid lens-forming material so that the fluid lens-forming material is hardened to form the optical lens, and removing the optical lens from the molding cavity.

In yet another aspect, the present invention relates to an apparatus for molding an optical lens. In one embodiment, the apparatus includes a front mold, a back mold, and a closure member having an outer surface and cooperating with the front mold and the back mold to form a molding cavity therebetween for molding the optical lens. The closure member has at least one venting opening and at least one casting port spaced apart from each other at an acute angle at an upper portion of the molding cavity, the venting opening being in fluid communication with the molding cavity and the ambient air and the casting port being in fluid communication with the molding cavity and separated from the ambient air by the outer surface of the closure member.

In yet a further aspect, the present invention relates to an improvement in an apparatus for molding an optical lens. The apparatus includes a pair of opposed molding shells disposed on edge and substantially vertically oriented and which form a molding cavity therebetween with a closure member having an outer surface, the molding cavity having a center, a vertical axis and a horizontal axis perpendicular to each other, a casting port being separated from the ambient air and communicating with the cavity for the introduction therethrough into the cavity a fluid lens-forming material and a venting opening communicating into the cavity. In one embodiment, the improvement includes the venting opening being disposed at the upper most point of the molding cavity, where the vertical axis intersects the closure member, the venting opening and the casting port forming an acute angle therebetween at an upper portion of the molding cavity.

In another aspect, the present invention relates to an apparatus for molding an optical lens. In one embodiment, the apparatus includes a front mold, a back mold, and a closure member having an inner surface and an outer surface and cooperating with the front mold and the back mold to form a molding cavity therebetween for molding the optical lens. The closure member has at least one venting opening and at least one casting port spaced apart from each other at an acute angle at an upper portion of the molding cavity, the venting opening and the casting port being connected by a recess channel located at the inner surface.

In all of the embodiments above, the closure member can be in the form of a gasket or a sleeve. For the latter, the sleeve can be formed from an elastomeric material. Thus, a filling needle can be used to pierce the elastomeric sleeve and then inject the fluid lens-forming mixture into the molding cavity.

The venting opening and casting opening can be pre-manufactured, or they may be formed during the filling process by, say, a filling needle. The sizes of the venting opening and the casting opening may be same or may be different.

In a further aspect, the present invention relates to a strip for molding an optical lens in cooperation with a front mold and a back mold. In one embodiment, the strip includes a body having a first end, a second end, and an inner surface and an opposed outer surface, and a recess channel formed on the inner surface. The recess channel can be formed on the inner surface continuously, extending from the first end to the second end of the body. Alternatively, the recess channel can be formed on the inner surface discontinuously. In use, the strip can be wrapped around the edges of the front mold and the back mold to form a sleeve cooperating with the front mold and the back mold to define a molding cavity.

In yet another aspect, the present invention relates to a sleeve for molding an optical lens in cooperation with a front mold and a back mold. In one embodiment, the sleeve includes a body portion having a first end and a second end, an inner surface and an opposed outer surface, a bore extending from the first end and the second end axially, a venting port formed on the body portion, a casting port formed on the body portion and positioned apart from the venting port, and a recess channel formed on the inner surface connecting the venting port and the casting port. The recess channel can be formed to extend continuously from the venting port and the casting port. The bore is adapted to receive the front mold and the back mold to define a molding cavity. Additionally, the casting port is formed intermediate the outer surface of the body portion and the bore such that the casting port is separated from the ambient air by the outer surface of the body portion and is in fluid communication with the molding cavity.

These and other aspects will become apparent from the following description of various embodiments taken in conjunction with the following drawings, although variations and modifications therein may be affected without departing from the spirit and scope of the novel concepts of the disclosure.

DETAILED DESCRIPTION OF THE INVENTION

The present invention is more particularly described in the following examples that are intended as illustrative only since numerous modifications and variations therein will be apparent to those skilled in the art. As used in the specification and in the claims, "a" can mean one or more, depending upon the context in which it is used. The embodiments are now described with reference to the figures, in which like numbers indicate like parts throughout the figures.

Referring generally to FIGS. 3–7, the present invention relates to an apparatus and method of filling a mold 10 for manufacturing an optical lens. The mold 10 is formed by two molding shells 12A, 12B disposed on edge and an annular closure member 14 at the periphery of the molding shells 12A, 12B, defining between them a molding cavity 16.

In one embodiment, the molding shells 12A, 12B are rotationally aligned relative to each other and axially positioned apart from each other at the desired axial separation distance (e.g., the appropriate separation to produce a lens of a desired thickness). When properly positioned, the facing inside surfaces of the molding shells 12A, 12B are a negative image of the required opposing surfaces of the optical lens to be formed. These surfaces are coaxial in the embodiments shown with a common axis A. Cross-sectionally, they have a common center 13. Thus, if the molding shells 12A, 12B are disposed on edge, the axis A is substantially horizontal and the molding shells 11A, 11B are substantially vertical. Moreover, as shown in FIGS. 4–7, the molding cavity 16, and thus the mold 10, can be divided into an upper portion 11A and a lower portion 11B by a horizontal axis X which passes through the center 13. The mold 10 has a vertical axis Y (not shown), which is perpendicular to the axis X and passes through the center 13.

As shown in FIGS. 3–7, the molding shells 12A, 12B have a generally circular outside contour. Alternatively, the contour may take other suitable geometric shapes such as oval, rectangular, or square. The intersection of the axis Y and the outside contour of the upper portion of 11A defines a highest or upper most point 17 of the molding cavity 16.

Figure 3:
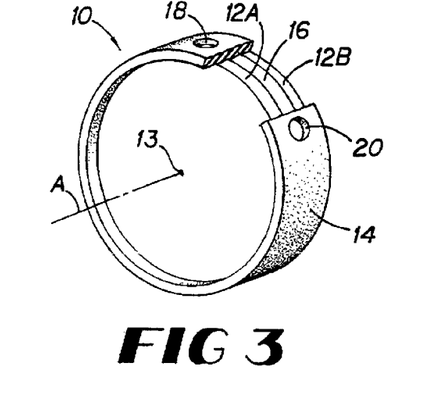
FIG. 3 is a perspective view of a mold according to one embodiment of the present invention with a portion of the closure member broken away for clarity.

The closure member 14 in the embodiment shown in FIG. 3 is in the form of a tubular sleeve. The tubular sleeve engages the edges of the molding shells 12A, 12B to form the molding cavity 16. The sleeve can be formed from a strip which is wound around the edges of the molding shells 12A, 12B. This strip may be an adhesive synthetic material or a heat-shrink material so that the formed sleeve adheres to the molding shells. Alternatively, the strip can be an elastomeric and nonadhesive material so that the resulting sleeve allows the molding shells 12A, 12B to slide along the axis A during the curing process to compensate for the shrinkage of the lens-forming material. Additionally, the closure member 14 may be in the form of a gasket.

The closure member 14 has a venting opening 18 and a casting opening 20. The venting opening 18 is in communication with the molding cavity 16 so that the air may be vented out from the molding cavity 16. In the embodiments shown, the venting opening 18 is in the upper portion 11A of the molding cavity 16, substantially at or adjacent the upper most point 17 of the molding cavity 16.

Figure 4:
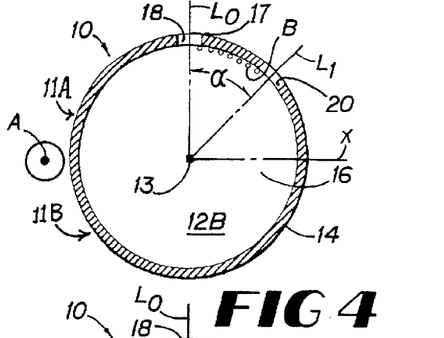
FIG. 4 is a vertical cross-sectional view of the closure member of FIG. 3.

The casting opening 20 is also in communication with the molding cavity 16 so that a fluid lens-forming material may be introduced through it into the molding cavity 16. The casting opening 20 is also located in the upper 11A portion of the molding cavity 16 as well, but apart from the venting opening 18. In accordance with the present invention, as shown in FIGS. 3–7, the position of the venting opening 18 is always higher than the position of the casting opening 20 so that air bubbles can readily be vented outward there through. Moreover, as shown in FIG. 4, the venting opening 18 and the casting opening 20 form an angle, α, therebetween. The angle α can be viewed as the angle between the axis $L_1$, which is a radial axis connecting the center 13 and the center of the casting opening 20, and the axis $L_o$, which is a radial axis connecting the center 13 and the center of the venting opening 18. For the embodiments shown in FIGS. 3–7, the axis $L_o$ merges with the axis Y, although it does not have to.

The present invention requires that the angle α be an acute angle. This ensures that during the filling process, the air bubbles B will not travel through the most optically active area of the lens to reach the venting opening 18. Instead, the bubbles likely will travel along the inside surface of the closure member 14 to reach the venting opening 18 as shown in FIG. 4. Indeed, because of gravity, the air bubbles B will always be above the surface of the lens-forming fluid filled in the molding cavity during the filling process. Thus, the present invention makes it possible that the most optically active area of the lens may not be disturbed at all.

In the present invention, while the angle α may take any nonzero value between 0 to 90°, the preferred range for the angle α is 5° to 85°, and the optimal range for the angle α is 5° to 50°. It is understood that although the casting opening 20 shown in FIGS. 3 and 4 is on the right of the venting opening 18, the casting opening 20 may be located at the left as well as shown in FIG. 5.

Figures 5, 6, 7:
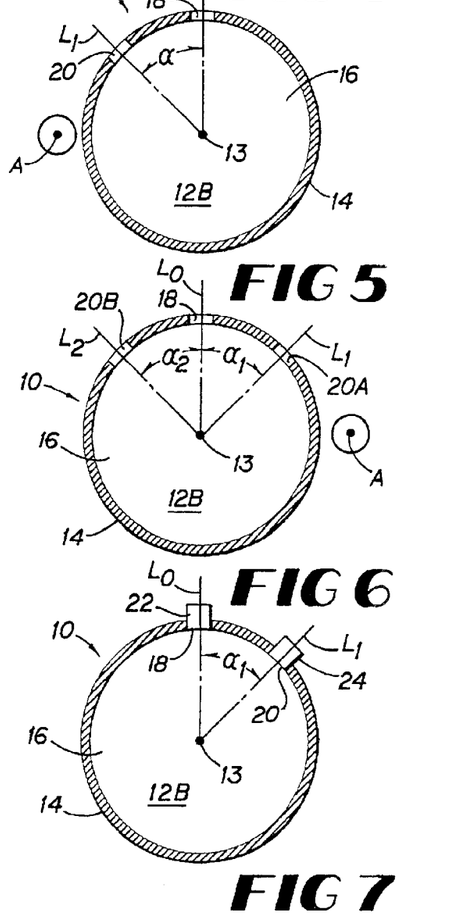
FIG. 5 is a vertical cross-sectional view of a second embodiment of the closure member used in the present invention.
FIG. 6 is a vertical cross-sectional view of a third alternative embodiment of the closure member used in the present invention.
FIG. 7 is a vertical cross-sectional view of a fourth embodiment of the closure member used in the present invention.

The casting opening 20 may be a hole as shown in FIGS. 3–5. Cross-sectionally, the casting opening 20 may be in circular, oval, or other proper geometric shapes. Similarly, the venting opening 18 may be a hole in practice as shown in FIGS. 3–5. Cross-sectionally, the venting opening 18 may be in circular, oval, or other proper geometric shapes. The venting opening 18 and the casting opening 20 may be identical, or different, size-wise and shape-wise.

Alternatively, as shown in FIG. 7, the venting opening 18 may be in association with a venting port 22. Similarly, the casting opening 20 may be associated with a casting port 24. The venting port 22 may be used to support a conventional air pump (not shown) for creating a suction to facilitate air venting. The casting port 24 may be used to support or position a filling needle (not shown) for better filling. Additional embodiments of the casting port are discussed below.

In the embodiments shown in FIGS. 3–7, the venting opening 18 and the casting opening 20 can be pre-manufactured. Alternatively, for the embodiment where the closure member 14 is formed of elastomeric material or other synthetic material, the venting opening 18 and the casting opening 20 may be formed by a filling needle directly piercing through the closure member 14 before or during the filling process.

The fluid lens-forming material is introduced into the molding cavity 16 through the casting opening 20. The filling can be done at a filling station (not shown) where the mold 10 is disposed substantially vertically so that the venting opening 18 is located at or adjacent the upper most point 17 of the molding cavity 16. During the filling process, a filling needle (not shown) is used for injecting a desired amount of the fluid lens-forming material into the molding cavity 16. The filling needle is connected to a reservoir (not shown) of the fluid lens-forming material. The filling needle enters the casting opening 20, if one has been pre-manufactured, or pierces the closure member 14 to create one if not. Either way, the filling needle establishes fluid communication between the reservoir and the molding cavity 16 through the casting opening 20. The filling needle can inject the desired amount of fluid lens-forming material into the molding cavity 16 in a continuous or discontinuous manner.

Since the casting opening 20 is located at the upper portion 11A of the molding cavity 16, gravity helps the flow of the fluid lens-forming material into the molding cavity 16. Therefore, it is not necessary to provide pumping means to fill the molding cavity. Moreover, because of gravity, the lens-forming material naturally fills the molding cavity 16 from the bottom up while the air bubbles B travel to the venting opening 18 without passing through the center region of the molding cavity 16. Consequently, the likelihood of having optical defects in the most optically active region of the formed lens is greatly reduced and better lenses can be made by practicing the present invention.

Once a proper amount of the fluid lens-forming material is introduced into the molding cavity 16, the filling needle is withdrawn from the cavity 16 and the closure member 14. The fluid lens-forming material is then cured and hardened. As one skilled in the art will appreciate, curing can be accomplished in a number of ways. For example, the curing method of the present invention involves exposing the fluid lens-forming material to an ultraviolet ("UV") light for a desired time. Alternatively, after exposing the fluid lens-forming material to UV light, the fluid lens-forming material is then heated for a predetermined time, such as in an infra-red ("IR") oven. The second heating step solidifies the fluid lens-forming material to form the hardened lens if the material is not sufficiently cured in the UV step.

FIG. 6 shows another or third embodiment of the present invention, wherein the closure member 14 has two casting openings 20A, 20B. The casting opening 20A is located at an angle $\alpha_1$ apart from the venting opening 18 while the casting opening 20B is located at an angle $\alpha_2$ apart from the venting opening 18. Angles $\alpha_1$ and $\alpha_2$ can be different acute angles. However, they may have same value. In other words, the casting openings 20A, 20B may be symmetric about the venting opening 18, which is positioned at or adjacent to the highest or upper most point 17 on the molding cavity 16. Casting openings 20A, 20B allow two filling needles to introduce the fluid lens-forming material into the molding cavity 16 simultaneously and thus shorten the filling process significantly. Furthermore, the closure member 14 may have more than two casting openings. Again, each of the multiple casting openings can be located at a same or different angle apart from the venting opening than the rest of the casting openings. The casting openings may be symmetrically distributed about the venting opening. Or they may be asymmetrically distributed about the venting opening. It is not necessary to use every casting opening available to fill the mold. Nevertheless, incorporating a mold with multiple casting openings of the present invention with automation technology available in the art may greatly reduce the production time of molding an optical lens.

Figure 8:
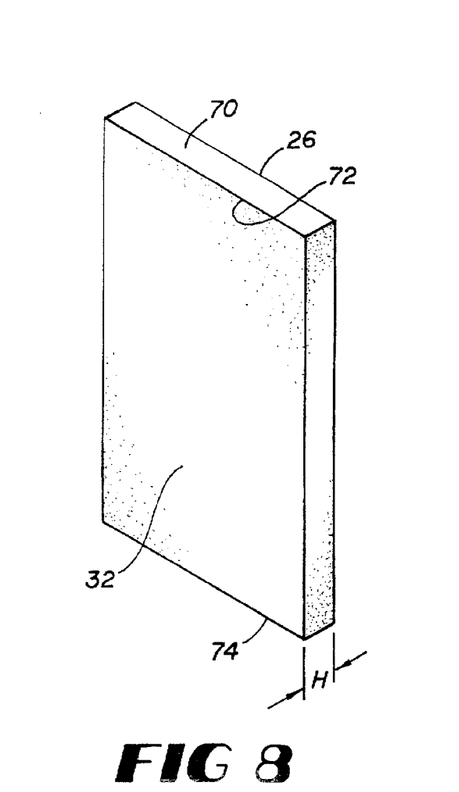
FIG. 8 is a perspective view of a strip used in the present invention.
Figure 9:
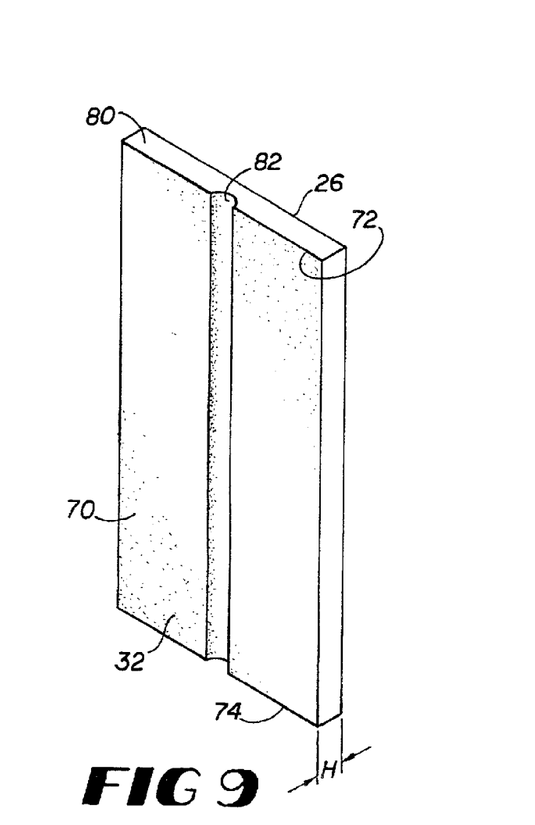
FIG. 9 is a perspective view of an alternative embodiment of the strip used in the present invention.
Figure 11:
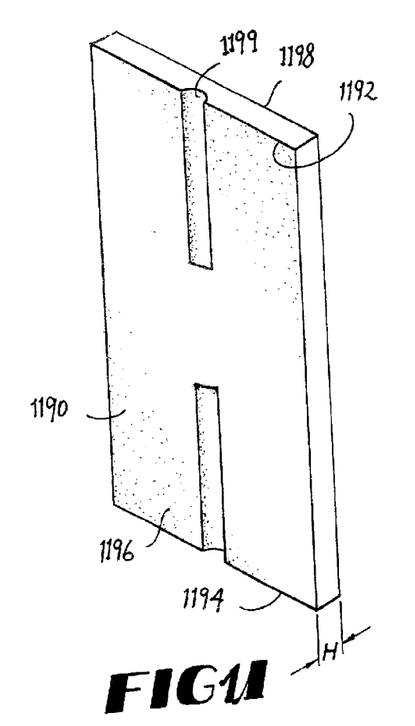
FIG. 11 is a perspective view of another alternative embodiment of the strip used in the present invention.

As discussed above and shown in FIG. 3, the closure member 14 can take a form of a sleeve that is formed from a strip. FIGS. 8, 9 and 11 show several embodiments of the strip that can be utilized to practice the present invention.

Referring to FIG. 8, where a strip 70 of elastomeric material that can be used to form sleeve 14 is shown. The strip 70 has two opposing ends 72, 74, two opposing surfaces 26, 32 and a thickness H between the surfaces 26 and 32. Surfaces 26, 32 are substantially flat. The range of thickness H is 1 millimeter to 8 millimeter. In one embodiment, the range of thickness H can be 2 millimeter to 6 millimeter. Alternatively, the range of thickness H can be 3 millimeter to 4 millimeter.

Figure 10:
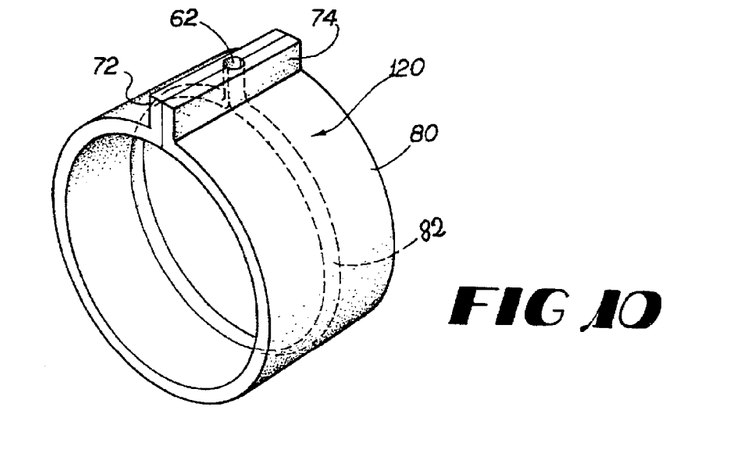
FIG. 10 is a perspective view of an embodiment of the closure member in the form of a sleeve, partially in schematic, of the present invention by utilizing the strip as shown in FIG. 9.

FIG. 9 shows an alternative form of a strip of elastomeric material that can be used to form sleeve 14. In FIG. 9, strip 80 has two opposing ends 72, 74, two opposing outer and inner surfaces 26, 32 and a thickness H between the outer and inner surfaces 26, 32. Outer and inner surfaces 26, 32 are substantially flat. Additionally, inner surface 32 may have a recess 82, extending from end 72 to end 74, as shown in FIG. 9. In this embodiment, the recess 82 is a continuous channel across the inner surface 32. The recess 82 can be located substantially around the middle section of the inner surface 32 so that the recess 82 can be conveniently used as a venting channel and/or a passage for providing fluid communication between the cavity 16 and a fluid reservoir (not shown) once a sleeve 120 is formed from the strip 80, as shown in FIG. 10. In the embodiment shown in FIG. 10, the sleeve 120 has a venting opening 62 open to the ambient air that is formed by the portion of the recess channel 82 at the end 72 and the portion of the recess channel 82 at the end 74 when the ends 72 and 74 of the strip 80 are fastened together as shown in FIG. 10 to form sleeve 120. A casting opening (not shown) may be formed by a filling needle directly piercing through the sleeve 120 at a position located along the recess channel 82 and apart from the venting opening 62. As formed, the recess channel 82 can act as a casting port that is separated from the ambient air by the outer surface of the closure member and is in fluid communication with the molding cavity. Once a fluid lens-forming material is introduced into the molding cavity through a casting port or a filing needle in communication with the recess channel 82, the lens-forming material naturally fills the molding cavity from the bottom up while any air bubbles may travel to the venting opening 62 partially through part of the recess channel 82 without passing through the center region of the molding cavity.

The recess 82 may be located elsewhere per a user's choice as long as the recess 82 can be in fluid communication with the lens-forming fluid filled in the cavity 16. Moreover, the recess 82 may be square, rectangular, circular, oval, semi-oval, semi-circular, or other proper geometrical shapes cross-sectionally. For the embodiment of the present invention shown in FIGS. 9 and 10, the recess 82 is semi-circular cross-sectionally.

FIG. 11 shows yet another alternative form of a strip of elastomeric material that can be used to form closure member 14. In FIG. 11, strip 1190 has two opposing ends 1192, 1194, two opposing inner and outer surfaces 1196, 1198 and a thickness H between the surfaces 1196 and 1198. Inner and outer surfaces 1196, 1198 are substantially flat. Additionally, inner surface 1192 may have a recess 1199, extending discontinuously from end 1192 to end 1194, as shown in FIG. 11. In this embodiment, the recess 1199 is a discontinuous channel across at least part of the interior surface 1196. The recess 1199 can be located substantially around the middle section of the inner surface 1196 so that the recess 1199 can be conveniently used as a venting channel and/or a passage for providing fluid communication between the cavity 16 and a fluid reservoir (not shown) once a sleeve 1200 is formed from the strip 1190, as shown in FIG. 12.

Figure 12:
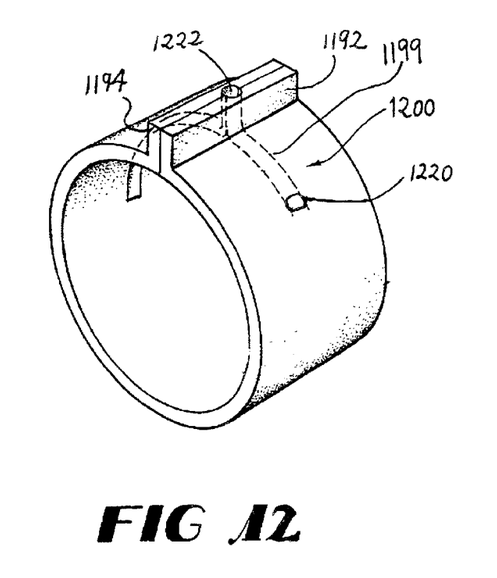
FIG. 12 is a perspective view of an embodiment of the closure member in the form of a sleeve, partially in schematic, of the present invention by utilizing the strip as shown in FIG. 11.

In the embodiment shown in FIG. 12, the sleeve 1200 has a venting opening 1222 open to the ambient air that is formed by the portion of the recess channel 1199 at the end 1192 and the portion of the recess channel 1199 at the end 1194 when the ends 1192 and 1194 of the strip 1190 are fastened together as shown in FIG. 12 to form sleeve 1200. A casting opening 1220 may be formed by a filling needle directly piercing through the sleeve 1200 at a position located along the recess channel 1199 and apart from the venting opening 1222. Again, as formed, the recess channel 1199 can act as a casting port that is separated from the ambient air by the outer surface 1198 of the closure member and is in fluid communication with the molding cavity.

Figure 13:
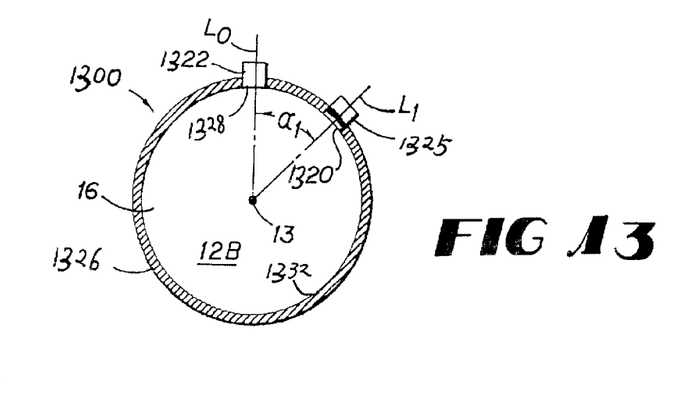
FIG. 13 is a cross-sectional view of the closure member in the form of a gasket, partially in schematic, of the present invention.

Alternatively, closure member 14 can take a form of a gasket. FIG. 13 shows one exemplary embodiment of a gasket that can be utilized to practice the present invention. In FIG. 13, gasket 1300 has a venting port 1322 and a casting port 1320. The venting port 1322 has a venting opening 1328 in fluid communication with the molding cavity and the ambient air. The casting port 1320 is formed in the body portion of the gasket 1300 between its outer surface 1326 and inner surface 1332. The casting port 1320 is in fluid communication with the molding cavity 16. The casting port 1320 is adapted to receive a portion of a needle therein so that the needle is in fluid communication with the cavity 16. Once a fluid lens-forming material is introduced into the molding cavity through the casting port 1320, the lens-forming material naturally fills the molding cavity from the bottom up while any air bubbles may travel to the venting opening 1322 and vent to the ambient air. Optionally, the venting port 1322 and the casting port 1320 can be connected by recess channel (not shown) similar to, for example, the recess channel 1199 as shown in FIG. 11. Additionally, casting port 1320 can have a casting support portion 1325 formed on the outer surface of the body portion of gasket 1300. The casting support portion 1325 may be adapted to support or position a filling device such as a filling needle (not shown) for better filling.

Another aspect of the gasket such as gasket 1300 of the present invention is the gasket material. In one embodiment, a desirable characteristic is that the gasket material is chemically compatible with the lens-forming fluid to avoid inhibiting polymerization of the fluid. The gasket material should not include free-radical inhibitors, such as "UV" stabilizers and antioxidants. A UV stabilizer can leach into the monomer because the monomer acts almost like a solvent to draw such an additive out of the gasket material and to mix locally into the monomer, causing the edges of the lens remain slightly wet after curing. The wetness can be a problem because it potentially results in the monomer adhering to the gasket 1300 and molds contained therein, which requires cleaning before reuse and increases operating expenses. Accordingly, a desired gasket is a polymeric elastomer compatible with optical monomers which will not inhibit lens monomer during the curing process. Still another aspect of the gasket material is that it be relatively soft, for example having a durometer between 40 and 70. Another concern is whether the gasket material has long-term stabilities.

In several embodiments, a suitable gasket material is thermoplastic rubber that contains KRATON®G, a styrene-ethylene-propylene (butylene) block copolymer, sold by Shell Oil Company® of Houston, Tex. Such rubber includes those sold under the trade names DYNAFLEX®G2703, 2711, and 2712 by GLS Corporation of Cary, Ill. These rubbers have a Shore A hardness ranging from about 43 to 62, a specific gravity of about 0.9 g/cc, a tensile modulus at 300% elongation ranging from about 355 to 470, tensile strength at break of about 680 to 1000 psi, and a tear strength of about 113 to 127. Another contemplated gasket material includes a PVC formulation. The gasket material of the present invention, however, is not limited to a single material. In fact, the desired gasket material can very depending on the specific monomer compound used to form the lens. That is, a certain gasket material may be utilized with a particular lens-forming fluid and different type of gasket material with another lens material. Other contemplated materials include elastomeric PVC, silicon, ethylene vinyl acetate, or a mixture thereof.

The fluid lens-forming material can be a monomer. One monomer that can be used to practice the present invention is manufactured by P.P.G. located at Pittsburgh, Pa., and sold under the trademark CR 424. As one skilled in the art will appreciate, other lens-forming materials known in the art can be used with the present invention.

In practicing the present invention, as discussed above, the closure member 14 may be a gasket or a sleeve made from elastomeric material so that a filling needle may pierce through the sleeve to establish a fluid communication channel with the molding cavity. In several embodiments of the present invention, a suitable sleeve material is thermoplastic rubber that contains KRATON®G, a styrene-ethylene-propylene (butylene) block copolymer, sold by Shell Oil Company of Houston, Tex. Such rubber includes those sold under the trademarks DYNAFLEX®G2703, 2711, and 2712 by GLS Corporation of Cary, Ill. These rubbers have a Shore A hardness ranging from about 43 to 62, a specific gravity of about 0.9 g/cc, a tensile modulus at 300% elongation ranging from about 355 to 470, tensile strength at break of about 680 to 1000 psi, and a tear strength of about 113 to 127. These rubbers have smooth surfaces and have a thickness in a range of 1 mm–8 mm. The sleeve material of the present invention, however, is not limited to a single material. In fact, the desired sleeve material can vary depending on the specific monomer compound used to form the lens.

That is, a certain sleeve material may be preferred with a particular lens-forming fluid and different type of sleeve material with another lens-forming material. Among many available materials, it is found that the present invention can be satisfactorily practiced with polyurethane, polyvinyl chloride, organosilicon elastomer as well as KRATON®G.

Although the present invention has been described with reference to specific details of certain embodiments thereof, it is not intended that such details should be regarded as limitations upon the scope of the invention except as and to the extent that they are included in the accompanying claims. Many modifications and variations are possible in light of the above disclosure.

For example, the invention has been described with reference to use a venting opening to vent out air from the molding cavity. An air pump may be used to cooperate with the venting opening to outlet air from the molding cavity, which, of course, is made possible by the separation of the venting opening and the casting opening provided by the present invention. Moreover, just like plurality of casting openings may be utilized to facilitate placing a lens-forming fluid into a molding cavity, a plurality of venting openings may be used to outlet air from the molding cavity. For example, a plurality of venting openings can be arranged at the top of the upper portion of the mold, but spaced apart from each other.

What is claimed is:

1. A method for molding an optical lens, comprising the steps of:
    a. providing a mold having two molding shells disposed on edge and substantially vertically oriented, and an annular closure member having an outer surface disposed at the periphery of the molding shells cooperating with the two molding shells to define a molding cavity having a center, a vertical axis and a horizontal axis perpendicular thereto, both axes passing through the center to thereby divide the mold into an upper portion and a lower portion, a venting opening and a casting port disposed at the upper portion of the mold and spaced apart from each other at an acute angle, wherein the venting opening is in fluid communication with the ambient air and the molding cavity, and the casting port is separated from the ambient air by the outer surface of the closure member and in fluid communication with the molding cavity;
    b. introducing a fluid lens-forming material into the molding cavity through the casting port;
    c. curing the fluid lens-forming material so that the fluid lens-forming material is hardened to form the optical lens; and
    d. removing the optical lens from the molding cavity.

2. The method of claim 1, wherein the venting opening is located at or adjacent the upper most point of the molding cavity.

3. The method of claim 1, wherein the position of the casting port is lower than the position of the venting opening at the molding cavity.

4. The method of claim 1, wherein the closure member is in the form of a gasket containing the molding shells therein.

5. The method of claim 1, wherein the closure member is in the form of a sleeve disposed around the molding shells.

6. The method of claim 1, wherein the fluid lens-forming material is a monomer.

7. A method for molding an optical lens, comprising the steps of:
    a. providing a mold having two molding shells disposed on edge and substantially vertically oriented, and an annular closure member disposed at the periphery cooperating with the two molding shells to define a molding cavity which has a center, a vertical axis and a horizontal axis perpendicular to each other, both axes passing through the center to thereby divide the mold into an upper portion and a lower portion, a venting opening disposed at the upper portion of the mold and communicating with the molding cavity;
    b. injecting a fluid lens-forming material into the molding cavity through a port at a position at the upper portion of the mold but apart from the location of the venting opening at acute angle, wherein the port is separated from the ambient air by the outer surface of the closure member;
    c. curing the fluid lens-forming material so that the fluid lens-forming material is hardened to form the optical lens; and
    d. removing the optical lens from the molding cavity.

8. The method of claim 7, wherein the venting opening is located at or adjacent the upper most point of the molding cavity.

9. The method of claim 7, wherein the fluid lens-forming material is a monomer.

10. The method of claim 7, wherein the closure member is in the form of a sleeve disposed around the molding shells.

11. The method of claim 10, wherein the sleeve is formed from an elastomeric material.

12. The method of claim 11, wherein the step of injecting the fluid lens-forming material further comprises the steps of: a. piercing the elastomeric sleeve through the port by a filling needle; and b. injecting the fluid lens-forming material into the cavity through the filling needle.

13. The method of claim 7, wherein the closure member is in the form of a gasket containing the molding shells therein.

14. A method for molding an optical lens, comprising the steps of:
    a. providing a mold having two molding shells disposed on edge and substantially vertically oriented, and an annular closure member having an outer surface disposed at the periphery cooperating with the two molding shells defining a molding cavity with a center and having a vertical axis and a horizontal axis perpendicular to each other, both axes passing through the center thereby dividing the mold into an upper portion and a lower portion, a venting opening and a plurality of casting openings disposed at the upper portion of the mold and spaced apart from each other, the venting opening and each of the casting openings forming an acute angle between them, the venting opening and the plurality of casting openings communicating with the molding cavity, wherein at least one of the plurality of casting openings is a port being separated from the ambient air by the outer surface of the closure member;
    b. introducing a fluid lens-forming material into the molding cavity through a casting opening;
    c. curing the fluid lens-forming material so that the fluid lens-forming material is hardened to form the optical lens; and
    d. removing the optical lens from the molding cavity.

15. The method of claim 14, wherein the venting opening is located at or adjacent the upper most point of the molding cavity.

16. The method of claim 14, wherein the position of each casting opening is lower than the position of the venting opening at the molding cavity.

17. The method of claim 14, wherein the closure member is in the form of a sleeve disposed around the molding shells.

18. The method of claim 17, wherein the sleeve is made from an elastomeric material.

19. The method of claim 14, wherein the casting openings are substantially identical to each other.

20. The method of claim 14, wherein the casting openings are substantially symmetrical about the venting opening.

21. The method of claim 14, wherein the closure member is in the form of a gasket containing the molding shells therein.

22. An apparatus for molding an optical lens, comprising:
   a. a front mold and a back mold; and
   b. a closure member having an outer surface and cooperating with the front mold and the back mold to form a molding cavity therebetween for molding the optical lens, wherein the closure member has at least one venting opening and at least one casting port spaced apart from each other at an acute angle at an upper portion of the molding cavity, the venting opening being in fluid communication with the molding cavity and the ambient air and the casting port being in fluid communication with the molding cavity and separated from the ambient air by the outer surface of the closure member.

23. The apparatus of claim 22, further comprising means for substantially vertically positioning the molds so that the at least one venting opening is located at or adjacent the upper most point of the molding cavity.

24. The apparatus of claim 22, wherein the closure member is a gasket.

25. The apparatus of claim 22, wherein the closure member is a sleeve.

26. The apparatus of claim 25, wherein the sleeve is made of an elastomeric material selected from the group of polyurethane, polyvinyl chloride, organosilicon elastomer and thermoplastic rubbers containing a styrene-ethylene-propylene (butylene) block copolymer.

27. An improvement in an apparatus for molding an optical lens of the type having a pair of opposed molding shells disposed on edge and substantially vertically oriented and which form a molding cavity therebetween with a closure member having an outer surface, the molding cavity having a center, a vertical axis and a horizontal axis perpendicular to each other, a casting port being separated from the ambient air and communicating with the cavity for the introduction therethrough into the cavity a fluid lens-forming material and a venting opening communicating into the cavity, the improvement comprising:
   the venting opening being disposed at the upper most point of the molding cavity, where the vertical axis intersects the closure member, the venting opening and the casting port forming an acute angle therebetween at an upper portion of the molding cavity.

28. An apparatus for molding an optical lens, comprising:
   a. a front mold and a back mold; and
   b. a closure member having an inner surface and an outer surface and cooperating with the front mold and the back mold to form a molding cavity therebetween for molding the optical lens, wherein the closure member has at least one venting opening and at least one casting port spaced apart from each other at an acute angle at an upper portion of the molding cavity, the venting opening and the casting port being connected by a recess channel located at the inner surface.

29. The apparatus of claim 28, wherein the casting port is in fluid communication with the molding cavity and separated from the ambient air by the outer surface of the closure member.

30. The apparatus of claim 28, wherein the closure member is a gasket.

31. The apparatus of claim 28, wherein the closure member is a sleeve.

32. A sleeve for molding a lens in cooperation with a front mold and a back mold, comprising:
   a. a body portion having a first end and a second end, an inner surface and an opposed outer surface, a bore extending from the first end to the second end axially;
   b. a venting port formed through the body portion to interconnect the inner portion and the outer portion;
   c. a casting port formed on the body portion and positioned apart from the venting port; and
   d. a recess channel formed on the inner surface connecting the venting port and the casting port.

33. The sleeve of claim 32, wherein the recess channel extends continuously from the venting port to the casting port.

34. The sleeve of claim 32, wherein the bore is sized to receive the front mold and the back mold to define a molding cavity.

35. A sleeve for molding a lens in cooperation with a front mold and a back mold, comprising:
   a. a body portion having a first end and a second end, an inner surface and an opposed outer surface, a bore extending from the first end to the second end axially and sized to receive a front mold and a back mold to define a molding cavity;
   b. a venting port formed on the body portion;
   c. a casting port formed on the body portion and positioned apart from the venting port; and
   d. a recess channel formed on the inner surface connecting the venting port and the casting port,
   wherein the casting port is formed intermediate the outer surface of the body portion and the bore such that the casting port is separated from the ambient air by the outer surface of the body portion and is in fluid communication with the molding cavity.

* * * * *

UNITED STATES PATENT AND TRADEMARK OFFICE
CERTIFICATE OF CORRECTION

PATENT NO. : 6,787,070 B2
APPLICATION NO. : 09/938279
DATED : September 7, 2004
INVENTOR(S) : Kai C. Su

It is certified that error appears in the above-identified patent and that said Letters Patent is hereby corrected as shown below:

Column 1, line 22, "often referred as" should read --often referred to as--.

Column 5, line 63, "molding shells 11A, 11B" should read --molding shells 12A, 12B--.

Signed and Sealed this

Twenty-first Day of November, 2006

JON W. DUDAS
*Director of the United States Patent and Trademark Office*